United States Patent [19]

Matsumoto et al.

[11] 4,339,761
[45] Jul. 13, 1982

[54] COMPACT PLUNGER PUMP

[75] Inventors: Masafumi Matsumoto, Asukamura; Matahira Kotani, Nara, both of Japan

[73] Assignee: Sharp Kabushiki Kaisha, Osaka, Japan

[21] Appl. No.: 134,317

[22] Filed: Mar. 26, 1980

Related U.S. Application Data

[63] Continuation-in-part of Ser. No. 97,389, Nov. 26, 1979, Pat. No. 4,263,602.

[30] Foreign Application Priority Data

Mar. 22, 1979 [JP] Japan ............................ 54-37764[U]

[51] Int. Cl.³ ........................ G01D 15/18; F16J 10/00
[52] U.S. Cl. ............................... 346/75; 346/140 R; 92/171
[58] Field of Search ............... 346/75, 140 IJ; 92/169, 92/171

[56] References Cited

U.S. PATENT DOCUMENTS

| | | | |
|---|---|---|---|
| 2,796,885 | 6/1957 | Garrett et al. | 92/171 X |
| 3,712,182 | 1/1973 | Penwell | 92/169 |
| 3,881,557 | 5/1975 | Gendron et al. | 92/169 X |
| 4,162,616 | 7/1979 | Hayashida | 92/171 X |
| 4,263,602 | 4/1981 | Matsumoto et al. | 346/75 X |

Primary Examiner—George H. Miller, Jr.
Attorney, Agent, or Firm—Birch, Stewart, Kolasch & Birch

[57] ABSTRACT

An ink liquid supply system for an ink jet system printer comprises an ink liquid reservoir for containing ink liquid therein, and a constant flow rate plunger pump for supplying the ink liquid to a nozzle. The constant flow rate plunger pump comprises a cylinder block, a bush exchangeably secured to a cylinder portion of the cylinder block, a piston slidably disposed in the bush, and a diaphragm secured to one end of the piston. A first pressure chamber is defined by the other end of the piston, and a second pressure chamber is defined by the diaphragm. In response to the reciprocating movement of the piston, the first pressure chamber functions to introduce the ink liquid from the ink liquid reservoir and to develop the ink liquid of a constant flow rate to the nozzle. At the same time, the second pressure chamber functions to introduce a waste ink liquid from a beam gutter of the ink jet system printer and to return the waste ink liquid to the ink liquid reservoir.

16 Claims, 2 Drawing Figures

COMPACT PLUNGER PUMP

This application is a continuation-in-part of application Ser. No. 97,389, filed on Nov. 26, 1979, now U.S. Pat. No. 4,263,602.

BACKGROUND AND SUMMARY OF THE INVENTION

The present invention relates to a liquid supply plunger pump and, more particularly, to a constant flow rate liquid supply plunger pump of a compact size for use in an ink liquid supply system of an ink jet system printer of the charge amplitude controlling type.

A constant flow rate ink liquid supply pump is highly required in an ink jet system primter of the charge amplitude controlling type to ensure an accurate printing. When a plunger pump is used in the ink liquid supply system, the ink liquid leakage through a gap formed between the cylinder and the piston must be carefully considered. More specifically, the gap must be accurately controlled to ensure the constant flow rate liquid supply.

Accordingly, an object of the present invention is to provide a compact size plunger pump which ensures the constant flow rate liquid supply.

Another object of the present invention is to provide a constant flow rate plunger pump suited for mass production.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a bush is secured to a cylinder block. A piston is slidably disposed through the bush to define pressure chambers. In a preferred form, the bush is exchangeably secured to the cylinder block through the use of screwed portions formed on an outer surface of the bush and an inner surface of the cylinder block. The outer periphery of the piston is formed to show a high resistance to wear through the use of the surface thermal treatment or an organic film coating such as a tetrafluoroethylene coating.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
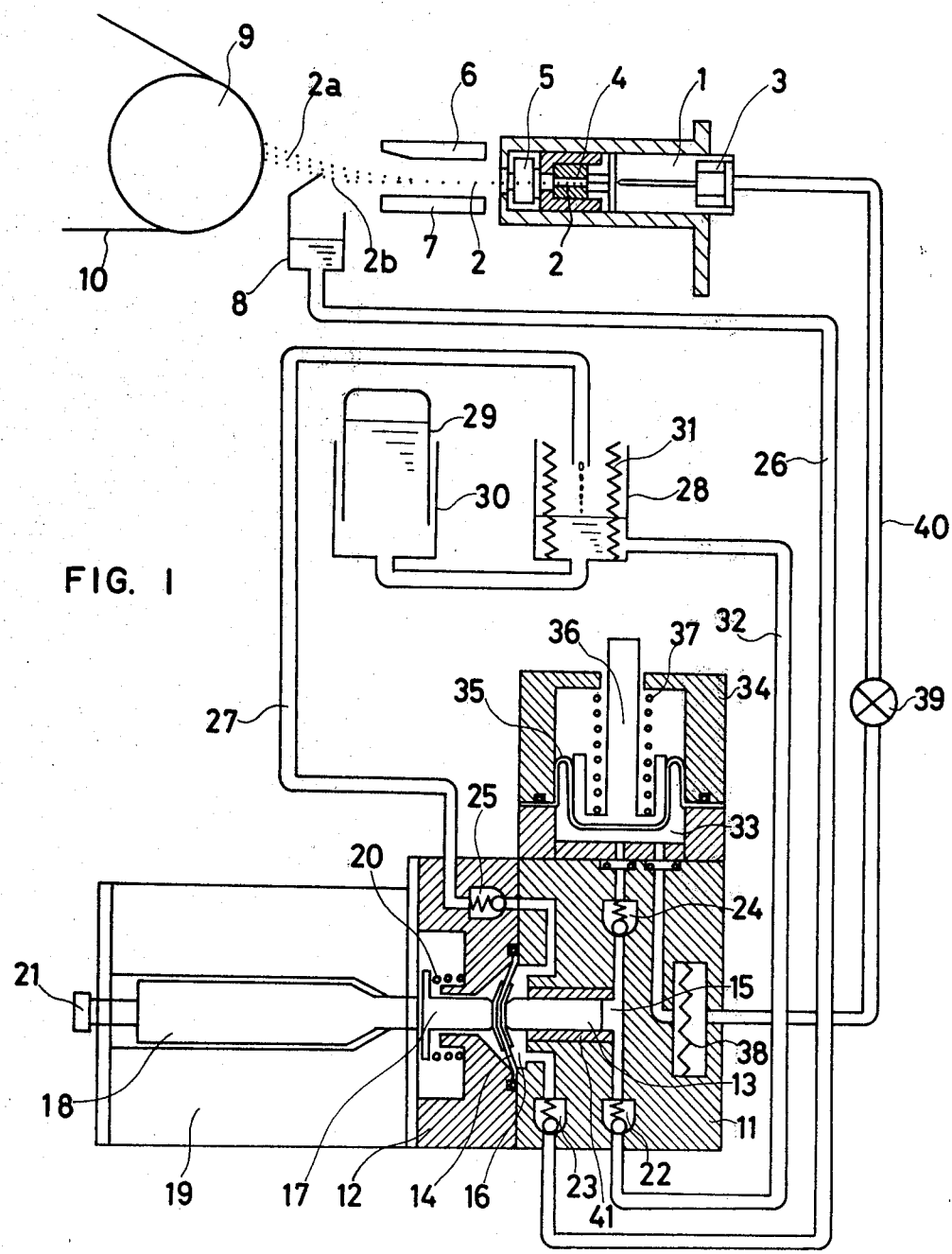
FIG. 1 is a block diagram of an ink liquid supply system for an ink jet system printer including an embodiment of a compact plunger pump of the present invention.

FIG. 1 shows an ink liquid supply system for an ink jet system printer including an embodiment of a plunger pump of the present invention.

An ink jet system printer of the charge amplitude controlling type mainly comprises a nozzle 1 for emitting an ink liquid supplied from the ink liquid supply system. An electromechanical transducer 3 is attached to the nozzle 1 to vibrate the nozzle 1 at a given frequency, thereby forming ink droplets 2 at the given frequency. The thus formed ink droplets 2 are selectively charged through the use of a charging tunnel 4 in accordance with a print information signal. A sensing electrode 5 is disposed in front of the charging tunnel 4 to detect whether the ink droplets 2 are accurately charged. An output signal of the sensing electrode 5 is used for synchronizing the application of the charging signal to the charging tunnel 4 with the droplet formation rhythm as is well known in the art.

The thus charged ink droplets 2 are deflected while they pass through a constant high voltage electric field established by a pair of deflection electrodes 6 and 7 in accordance with charge amplitudes carried thereon. Deflected ink droplets 2a are directed to a record receiving paper 10 which is supported by a platen 9. Ink droplets 2b not contributing to the actual printing operation are not charged and are directed to a beam gutter 8 for recirculation purposes.

The above-mentioned nozzle 1, the electromechanical transducer 3, the charging tunnel 4, the sensing electrode 5, the deflection electrodes 6 and 7, and the beam gutter 8 are mounted on a carriage. The carriage is slidably supported by a shaft and driven to reciprocate transversely. The deflection caused by the deflection electrodes 6 and 7 is effected in the vertical direction, and the carriage is driven to travel in the lateral direction, whereby desired patterns are formed on the record receiving paper 10 in the dot matrix fashion.

The ink liquid collected by the beam gutter 8 is returned to the ink liquid supply system through a conduit 26. The thus returned ink liquid is introduced into a constant flow rate plunger pump, which develops the ink liquid of a fixed flow rate to be applied to the nozzle 1 through a conduit 40. The constant flow rate ink liquid is highly required to ensure an accurate printing or to stabilize the droplet formation.

The constant flow rate plunger pump mainly comprises two coaxial cylinder blocks 11 and 12, two coaxial pistons 13 and 17, and a diaphragm 14 interposed between the pistons 13 and 17. A first pressure chamber 15 is defined by the cylinder block 11 and the piston 13. A second pressure chamber 16 is defined by the cylinder block 11, the piston 13, and the diaphragm 14. Pressure in the chambers 15 and 16 is varied in response to the reciprocating movement of the coaxial pistons 13 and 17, and the diaphragm 14.

More specifically, the diaphragm 14 is supported by a reinforcing member, and secured to the piston 17 through the use of the piston 13 and the reinforcing member. The periphery of the diaphragm 14 is fixed between the cylinder blocks 11 and 12. When the piston 17 is driven to reciprocate, the diaphragm 14 and the piston 13 are moved in unison with the movement of the piston 17.

The piston 17 is connected to a plunger 18 which is associated with a DC solenoid 19. The DC solenoid 19 creates the rightward movement of the piston 17. A spring 20 is disposed between the cylinder block 12 and a flange portion of the piston 17 to provide the leftward movement of the piston 17. An adjusting screw 21 is provided for adjusting the stroke length of the plunger 18. That is, the adjusting screw 21 is used for adjusting the flow rate of the ink liquid developed from the constant flow rate plunger pump. The flow rate can alternatively be modified by changing a frequency of an activating signal to be applied to the DC solenoid 19.

The second pressure chamber 16 is communicated to the conduit 26 via an inlet valve 23 in order to introduce the ink liquid collected by the beam gutter 8. The thus introduced ink liquid is returned to a recovering tank 28 through an outlet valve 25 and a conduit 27. The recovering tank 28 stores the collected, returned ink liquid and a fresh ink liquid supplied from an ink liquid reservoir 30 including an ink liquid cartridge 29. A filter 31 is disposed in the recovering tank 28. The ink liquid stored in the recovering tank 28 is supplied to the first pressure chamber 15 through a conduit 32 and an inlet valve 22.

An outlet valve 24 is provided for the first pressure chamber 15 to develop an ink liquid of a constant flow rate toward a pressure accumulator 33. The pressure accumulator 33 comprises a cylinder 34, a resilient member 35, for example, a bellows or a diaphragm, a cap 36, and a spring 37. The periphery of the resilient member 35 is secured to the cylinder 34, and the resilient member 35 is biased downward through the use of the spring 37 and the cap 36. The pressure accumulator 33 functions to absorb variations in the flow rate. The ink liquid of a constant flow rate, which does not include pulsation, derived from the pressure accumulator 33 is supplied to the nozzle 1 through a filter 38, an electromagnetic valve 39, and the conduit 40.

The constant flow rate plunger pump of the present invention further comprises a bush 41 secured to the inner surface of the cylinder block 11, the bush 41 functioning to slidably support the piston 13. The bush 41 includes a screwed portion formed on the outer periphery thereof, and the inner surface of the cylinder block 11 is formed to have a screwed portion, whereby the bush 41 is exchangeably secured to the cylinder block 11.

Figure 2:
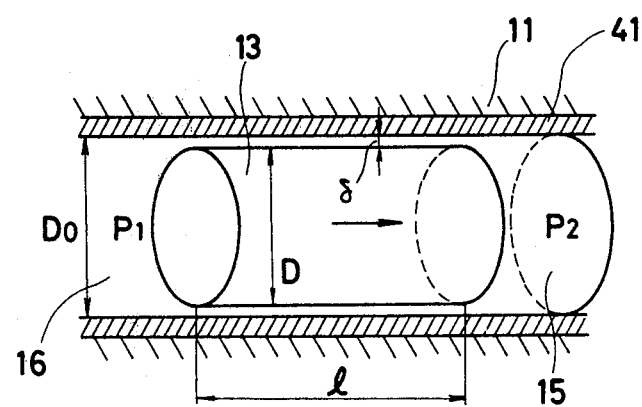
FIG. 2 is a schematic sectional view of pressure chambers included in the compact plunger pump of the present invention.

FIG. 2 shows the relationship between the cylinder block 11, the bush 41, and the piston 13.

Leak quantity $\Delta Q$ of the ink liquid flowing through a gap $\delta$ formed between the bush 41 and the piston 13, when the piston 13 is driven to travel rightward (shown by an arrow), is represented as follows:

$$\Delta Q = (\pi D \delta^3 P / 12 \mu l)$$

Where:
$\Delta Q$: the leak quantity
D: diameter of the piston 13

$$\delta: \text{gap} \left( = \frac{D_0 - D}{2} \right)$$

P: pressure difference ($=P_2-P_1$)
$P_2$: pressure in the first chamber 15
$P_1$: pressure in the second chamber 16
l: overlap length of the piston 13 and
$\mu$: viscosity of the ink liquid When the ink liquid viscosity $\mu$ increases, the pressure difference P also increases. Accordingly, these two factors can be neglected. It will be clear from the above equation that the leak quantity $\Delta Q$ is most greatly influenced by the gap $\delta$ formed between the bush 41 and the piston 13. The gap $\delta$ can be accurately controlled by increasing the accuracy of the bush 41 and the piston 13.

Therefore, the cylinder block 11 does not necessarily show the high accuracy. Accordingly, the cylinder blocks 11 and 12 can be made of synthetic resin. The outer periphery of the piston 13 is formed to show a high resistace to wear through the use of the surface thermal treatment of an organic film coating such as a tetrafluoroethylene coating.

When the plunger 18 is driven to travel rightward by the DC solenoid 19, the pistons 17 and 13 and the diaphragm 14 travel rightward. At this moment, the pressure in the first pressure chamber 15 is increased, whereby the ball valve in the outlet valve 24 is pushed upward against the spring to develop the ink liquid toward the pressure accumulator 33. At the same time, the pressure in the second pressure chamber 16 is also increased, and the ball valve in the outlet valve 25 is pushed leftward in FIG. 1 against the spring to develop the ink liquid toward the recovering tank 28 through the conduit 27.

When the plunger 18 has been shifted right by a predetermined length, the DC solenoid 19 is deenergized. Then, the pistons 17 and 13, and the plunger 18 are moved leftward due to the retaining strength of the spring 20 till the plunger 18 contacts the tip end of the adjusting screw 21.

While the pistons 17 and 13, and the diaphragm 14 travel leftward, a negative pressure is created in the first pressure chamber 15, whereby the ball valve in the inlet valve 22 is pushed upward against the spring to introduce the ink liquid from the recovering tank 28 through the conduit 32. The ink liquid amount introduced from the recovering tank 28 and supplied to the nozzle 1 is determined by the shift length of the piston 13 and its reciprocating frequency. At the same time, the negative pressure is also created in the second pressure chamber 16, whereby the ball valve in the inlet valve 23 is pushed upward against the spring to introduce the waste ink liquid collected by the beam gutter 8 through the conduit 26.

The above-mentioned operation is repeated to supply the ink liquid of a constant flow rate to the nozzle 1, and to effectively recover the ink liquid not contributing to the actual printing operation.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A constant flow rate plunger pump comprising:
   a cylinder block including a cylinder portion;
   a bush secured to said cylinder portion of said cylinder block;
   a piston slidably disposed in said bush;
   a first pressure chamber defined by said cylinder block and one end of said piston;
   a resilient member secured to the other end of said piston;
   a second pressure chamber defined by said cylinder block, said piston and said resilient member;

drive means for reciprocating said piston within said bush;

a first inlet valve communicating with said first pressure chamber for introducing a liquid into said first pressure chamber when said piston is driven to travel in a predetermined direction;

a first outlet valve communicating with said first pressure chamber for developing the liquid from said first pressure chamber when said piston is driven to travel in a direction counter to said predetermined direction;

a second inlet valve communicating with said second pressure chamber for introducing a liquid into said second pressure chamber when said piston is driven to travel in said predetermined direction; and a second outlet valve communicating with said second pressure chamber for developing the liquid from said second pressure chamber when said piston is driven to travel in a direction counter to said predetermined direction.

2. The constant flow rate plunger pump of claim 1, wherein said bush is exchangeably secured to said cylinder portion of said cylinder block.

3. The constant flow rate plunger pump of claim 2, wherein an outer surface of said piston is coated with a film having a high resistance to wear.

4. The constant flow rate plunger pump of claim 3, wherein said film comprises a tetrafluoroethylene film.

5. The constant flow rate plunger pump of claim 1, 2, 3 or 4, further comprising adjusting means for adjusting a travel length of said piston within said bush.

6. The constant flow rate plunger pump of claim 5, wherein said drive means comprises:

a plunger connected to the other end of said piston; and a DC solenoid for shifting said plunger in said direction counter to said predetermined direction when said DC solenoid is energized.

7. The constant flow rate plunger pump of claim 6, further comprising spring means for biasing said piston in said predetermined direction.

8. An ink liquid supply system for an ink jet system printer, said ink jet system printer comprising a nozzle for emitting an ink liquid supplied from said ink liquid supply system, and a beam gutter for collecting waste ink droplets emitted from said nozzle and for recovering the ink liquid toward said ink liquid supply system, said ink liquid supply system comprising:

an ink liquid reservoir for containing the ink liquid therein; and a constant flow rate plunger pump including, a cylinder block including a cylinder portion;

a bush secured to said cylinder portion of said cylinder block;

a piston slidably disposed in said bush;

a first pressure chamber defined by said cylinder block and one end of said piston;

a resilient member secured to the other end of said piston;

a second pressure chamber defined by said cylinder block, said piston and said resilient member;

drive means for reciprocating said piston within said bush;

a first inlet valve communicating with said first pressure chamber and with a first conduit connected to said ink liquid reservoir for introducing the ink liquid from said ink liquid reservoir into said first pressure chamber when said piston is driven to travel in a predetermined direction;

a first outlet valve communicating with said first pressure chamber and with a second conduit connected to said nozzle for developing the ink liquid from said first pressure chamber toward said nozzle when said piston is driven to travel in a direction counter to said predetermined direction;

a second inlet valve communicating with said second pressure chamber and with a third conduit connected to said beam gutter for introducing the waste ink liquid from said beam gutter into said second pressure chamber when said piston is driven to travel in said predetermined direction; and a second outlet valve communicating with said second pressure chamber and with a fourth conduit connected to said ink liquid reservoir for developing the waste ink liquid from said second pressure chamber toward said ink liquid reservoir when said piston is driven to travel in said direction counter to said predetermined direction.

9. The ink liquid supply system of claim 8, wherein said bush is exchangeably secured to said cylinder portion of said cylinder block.

10. The ink liquid supply system of claim 9, wherein said cylinder portion of said cylinder block includes a screwed portion, and an outer surface of said bush includes a screwed portion which is associated with said screwed portion of said cylinder block.

11. The ink liquid supply system of claim 8, 9 or 10, further comprising a pressure accumulator disposed between said first outlet valve and said nozzle.

12. The ink liquid supply system of claim 11, further comprising filter means disposed between said pressure accumulator and said nozzle.

13. The ink liquid supply system of claim 12, further comprising an electromagnetic valve disposed between said filter means and said nozzle.

14. The ink liquid supply system of claim 13, wherein said constant flow rate plunger pump further comprises an adjusting screw for determining a travel length of said piston within said bush.

15. The ink liquid supply system of claim 14, wherein said drive means comprises:

a plunger connected to the other end of said piston;

a DC solenoid for shifting said plunger in said direction counter to said predetermined direction when said DC solenoid is energized; and spring means for biasing said piston in said predetermined direction.

16. The ink liquid supply system of claim 15, wherein said resilient member comprises a diaphragm, the periphery of said diaphragm being fixed to said cylinder block.

* * * * *